United States Patent
Cho (10) Patent No.: US 9,891,365 B2
(45) Date of Patent: Feb. 13, 2018

(54) BACKLIGHT UNIT AND DISPLAY APPARATUS HAVING THE SAME

(71) Applicant: SAMSUNG ELECTRONICS CO., LTD., Suwon-si (KR)

(72) Inventor: Hyun-seung Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 15/049,213

(22) Filed: Feb. 22, 2016

(65) Prior Publication Data

US 2017/0082790 A1 Mar. 23, 2017

(30) Foreign Application Priority Data

Sep. 23, 2015 (KR) .......................... 10-2015-0134399

(51) Int. Cl.
*G09F 13/08* (2006.01)
*F21V 8/00* (2006.01)

(52) U.S. Cl.
CPC ............. *G02B 6/003* (2013.01); *G02B 6/009* (2013.01); *G02B 6/0025* (2013.01); *G02B 6/0031* (2013.01); *G02B 6/0068* (2013.01)

(58) Field of Classification Search
CPC .. G02B 6/0068; G02B 6/0036; G02B 6/0055; G02B 6/0031; G02B 6/0078; G02F 1/133615; F21V 15/01

USPC ..................................... 362/97.1, 613, 97.2
See application file for complete search history.

(56) References Cited

U.S. PATENT DOCUMENTS

| | | | |
|---|---|---|---|
| 7,556,415 B2 * | 7/2009 | Hamada | G02B 6/0068 362/231 |
| 8,998,474 B2 | 4/2015 | Nishitani et al. | |
| 2012/0275132 A1 | 11/2012 | Minami et al. | |

FOREIGN PATENT DOCUMENTS

| | | |
|---|---|---|
| JP | 2003-187623 A | 7/2003 |
| JP | 4723038 B1 | 7/2011 |
| KR | 10-2008-0043905 A | 5/2008 |
| KR | 10-2012-0134240 A | 12/2012 |

* cited by examiner

*Primary Examiner* — Jamara Franklin
(74) *Attorney, Agent, or Firm* — Sughrue Mion, PLLC (57) ABSTRACT

A backlight unit includes a light guide plate configured to emit light toward a display panel, and a plurality of light source units disposed adjacent to an edge of the light guide plate so as to irradiate light toward the light guide plate. The light source units include first and second light source modules configured to irradiate different types of light toward an edge of the light guide plate. The first light source modules are disposed adjacent to a first part of the edge of the light guide plate, and the second light source modules are disposed adjacent to a second part of the edge of the light guide plate.

20 Claims, 8 Drawing Sheets

BACKLIGHT UNIT AND DISPLAY APPARATUS HAVING THE SAME

CROSS-REFERENCE TO RELATED APPLICATIONS

This application claims priority from Korean Patent Application No. 10-2015-0134399, filed on Sep. 23, 2015, in the Korean Intellectual Property Office, the disclosure of which is incorporated herein by reference in its entirety.

BACKGROUND

1. Field of the Disclosure

Apparatuses and methods consistent with exemplary embodiments of the present disclosure relate to a backlight unit and a display apparatus having the same, and more particularly, to a backlight unit that irradiates the light of two types of light sources onto a light guide plate, and a display apparatus having the same.

2. Description of Related Art

A display apparatus is an apparatus operable to display an image by using a display panel. Display apparatuses are used in various types of devices, such as televisions (TVs), computer monitors, smartphones, tablets, etc.

However, some existing display apparatuses do not autonomously emit light and thus require an additional light source, such as a backlight unit. In some display apparatuses, the backlight unit is disposed behind the display panel. The backlight unit may be an edge-lit type unit, which requires a light guide plate uniformly guiding light irradiated from a light source to the display panel, or a direct-lit type unit, which does not require a light guide plate. In the direct-lit type backlight unit, a light source is disposed directly behind the display panel. This may result in an increased thickness of the display apparatus. However, some users demand thinner display apparatuses. In the edge-lit type backlight unit, a light source is disposed on a side of a light guide plate. This configuration allows display apparatuses using an edge-lit type backlight unit to be thinner than display apparatuses using a direct-lit type backlight unit.

Light-emitting diodes (LEDs) have been used as a light source in backlight units. LEDs have the advantages of a long lifespan, low power consumption, etc.

Backlight units that use LEDs as a light source may use white light, which is formed by a mixture of red, green, and blue light emitted from LEDs, as a backlight of a display apparatus. However, red, green, and blue light emitted from LEDs have different widths and strengths of wavelengths, and thus uniformities of the red, green, and blue lights may be impaired. As a result, when using LEDs as backlight, it may be difficult to realize white light similar to natural light, and thus a color reproduction range of the LED backlight unit may be impaired.

As a result of demands for display apparatuses that realize ultra-high definition (UHD) screens, two types of light source backlight units may be used along with a laser diode (LD) in an LED light source to improve a color reproduction range of a backlight unit using only an LED as a light source. However, if two types of light sources are used in a backlight unit, the emission distribution of light emitted from the two types of light sources may be different. Further, light guide plates may be necessary for the two types of light sources. As a result, an overall thickness of the backlight unit using the two types of light sources may become thicker due to an increase in the number of light guide plates.

SUMMARY

Exemplary embodiments of the present disclosure overcome the above-described disadvantages and other disadvantages not described above. Also, exemplary embodiments of the present disclosure are not required to overcome the disadvantages described above, and an exemplary embodiment of the present disclosure may not overcome any of the problems described above.

The present disclosure provides a slim backlight unit that uses one light guide plate to enable an overall thickness thereof to be reduced, and a display apparatus having the same.

According to an aspect of an exemplary embodiment, there is provided a backlight unit which includes a light guide plate configured to emit light incident thereon, a first plurality of light source modules disposed adjacent to an edge of the light guide plate to irradiate light toward the light guide plate, and a second plurality of light source modules disposed adjacent to the edge of the light guide plate to irradiate light toward the light guide plate. The first plurality of light source modules and the second plurality of light source modules may be configured to irradiate different types of light toward the edge of the light guide plate. The first plurality of light source modules may be disposed adjacent to a first part of the edge of the light guide plate, and the second plurality of light source modules may be disposed adjacent to a second part of the edge of the light guide plate such that the first plurality of light source modules and the second plurality of light source modules irradiate two types of light toward different parts of the same edge of the same light guide plate.

The backlight unit may further include a display panel. The first plurality of light source modules may be disposed closer to the display panel than the second plurality of light source modules.

The backlight unit may further include a printed circuit board (PCB) which includes a surface on which the first plurality of light source modules and second plurality of light source modules are mounted.

A height of the second plurality of light source modules may be lower than a height of the first plurality of light source modules relative to the display panel.

A first light emission distribution of the first plurality of light source modules may be different from a second light emission distribution of the second plurality of light source modules.

The first plurality of light source modules may include first light emitters, and the second plurality of light source modules may include second light emitters. The second light emitters may be disposed in pairs. Each pair of the paired second light emitters may be arranged relative to one another such that irradiation directions of the paired second light emitters are directed toward the light guide plate and oriented angularly relative to one another by a preset angle.

The second plurality of light source modules may include transparent molding parts configured to enclose the second light emitters.

The second plurality of light source modules may further include light diffusion members disposed within the transparent molding parts.

The backlight unit may further include a plurality of lens units formed on the second part of the edge of the light guide plate.

First front ends of the first plurality of light source modules may be offset from second front ends of the second plurality of light source modules relative to the edge of the light guide plate.

A protruding part of the edge of the light guide plate may protrude from a side of the light guide plate relative to the second part of the edge of the light guide plate.

The second plurality of light source modules may be disposed under the protruding part of the edge of the light guide plate.

The second front ends of the second plurality of light source modules may be disposed closer to the edge of the light guide plate than the first front ends of the first plurality of light source modules.

The second light emitters may include laser diodes (LDs).

The first light emitters may include at least one of light-emitting diodes (LEDs), cold cathode fluorescent lamps (CCFLs), organic light-emitting diodes (OLEDs), external electrode fluorescent lamps (EEFLs), or the like.

The LDs of the second light emitters may be red LDs, and the first light emitters may be cyan LEDs.

According to an aspect of an exemplary embodiment, there is provided a backlight unit which includes a light guide plate configured to emit light incident thereto, a plurality of light source units configured to irradiate light toward an edge of the light guide plate, and a PCB which includes a surface on which the plurality of light source units are mounted. Each light source unit of the plurality of light source units may include a first light source and a second light source module. The first light source modules and the second light source modules may be configured to irradiate light toward a common edge of the light guide plate. The first light source modules are configured to irradiate light having a first light emission distribution, and the second light source modules are configured to irradiate light having a second light emission distribution.

The second light source modules may include second light emitters. The second light emitters may be disposed in pairs. Each pair of the paired second light emitters may be arranged relative to one another such that irradiation directions of the paired second light emitters are directed toward the light guide plate and oriented angularly relative to one another by a preset angle.

According to an aspect of an exemplary embodiment, there is provided a display apparatus which includes a display panel, a chassis configured to enclose at least a portion of the display panel, and a backlight unit supported by the chassis. The backlight unit may include a light guide plate disposed behind the display panel, and a plurality of light source units disposed adjacent to an edge of the light guide plate and configured to irradiate light toward the light guide plate. Each light source unit of the plurality of light source units may include first light source module and a second light source module configured to irradiate different types of light toward a common edge of the light guide plate. The first light source modules may be disposed adjacent to a first part of the common edge of the light guide plate, and the second light source modules may be disposed adjacent to a second part of the common edge of the light guide plate.

The first light source modules may be disposed closer to the display panel, and the second light source modules may be disposed closer to the chassis. Front ends of the first light source modules may be offset from front ends of the second light source modules relative to the common edge of the light guide plate.

Additional and/or other aspects of the disclosure will be set forth in part in the description which follows and, in part, will be obvious from the description, or may be learned by practice of the disclosure.

BRIEF DESCRIPTION OF THE DRAWINGS

The above and other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Exemplary embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the exemplary embodiments of the present disclosure can be carried out without those specifically defined matters. Also, well-known functions or constructions are not described in detail since they would obscure the disclosure with unnecessary detail.

Figure 1:
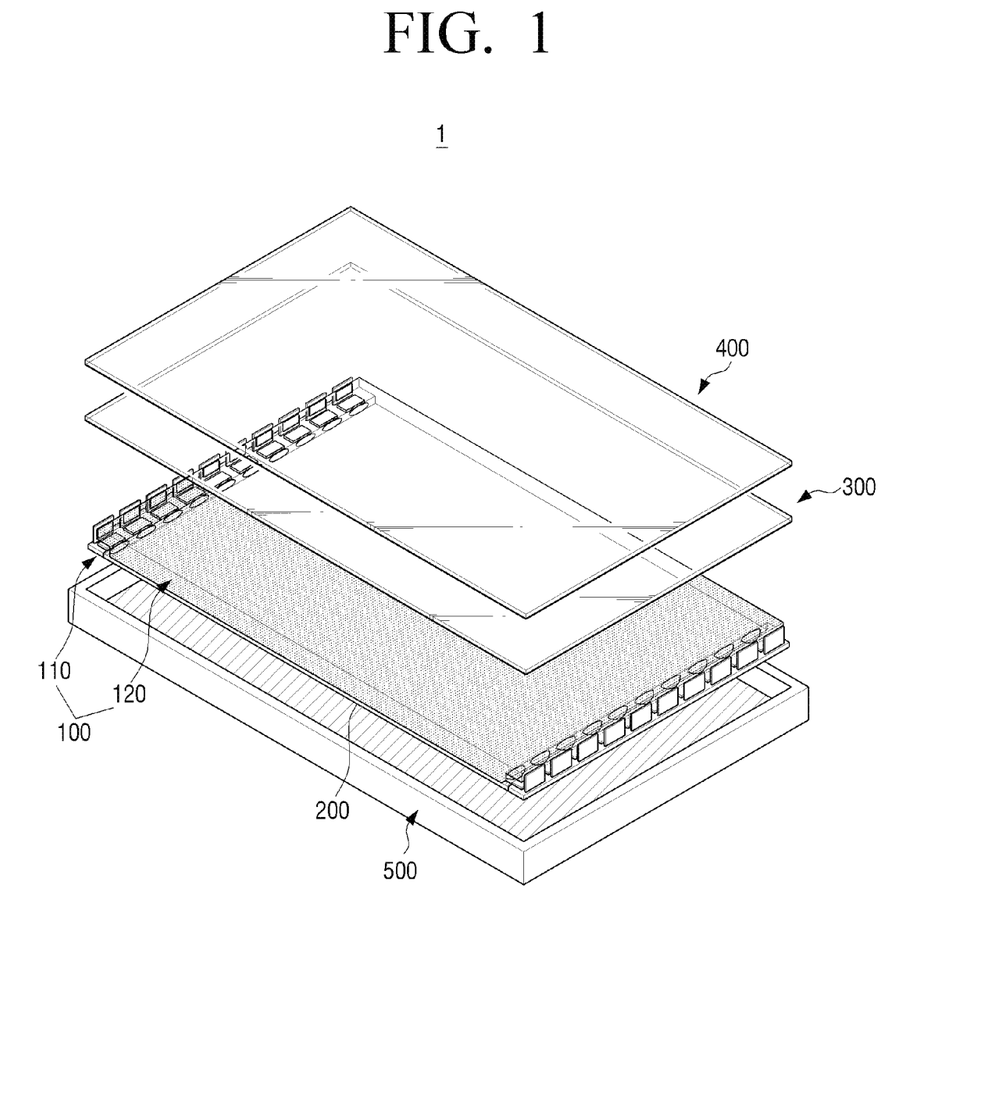
FIG. 1 is a perspective view of a display apparatus including a backlight unit, a reflective sheet, an optical sheet, a display panel, and a chassis, according to an exemplary embodiment of the present disclosure.

FIG. 1 is a perspective view of a display apparatus 1.

The display apparatus 1 includes a backlight unit 100, a reflective sheet 200, an optical sheet 300, a display panel 400, and a chassis 500, according to an exemplary embodiment of the present disclosure.

As shown in FIG. 1, the backlight unit 100 includes a plurality of light source units 110. The backlight unit 100 of the present embodiment is an edge-lit type unit, in which the light source units 110 are disposed adjacent to an edge of a light guide plate 120 to irradiate light toward the light guide plate 120. The light guide plate 120 uniformly emits incident light toward the optical sheet 300 and the display panel 400, which are disposed above the light guide plate 120. The reflective sheet 200 is disposed below the light guide plate 120 on a lower surface of the light guide plate 120 opposite an upper surface of the light guide plate 120 on which the optical sheet 300 is disposed. The reflective sheet 200 reflects a portion of the light incident onto the light guide plate 120. For example, the reflective sheet 200 reflects light incident onto the light guide plate 120, which is directed toward the lower surface of the light guide plate 120.

As described above, the optical sheet 300 is disposed on the upper surface of the light guide plate 120. The optical sheet 300 diffuses and scatters the light incident onto the light guide plate 120. The display panel 400 is disposed on the optical sheet 300. The display panel 400 displays an image through light emitted from the optical sheet 300. The chassis 500 of the present embodiment may support the backlight unit 100, the reflective sheet 200, the optical sheet 300, and/or the display panel 400. The chassis 500 of the present embodiment may also enclose a back of the backlight unit 100, the reflective sheet 200, the optical sheet 300, and/or the display panel 400.

It should be appreciated that the reflective sheet 200, the optical sheet 300, the display panel 400, and the chassis 500 used in the display apparatus 1 of the present embodiment may be configured into various shapes besides the shape shown in FIG. 1 and described herein.

Figure 2:
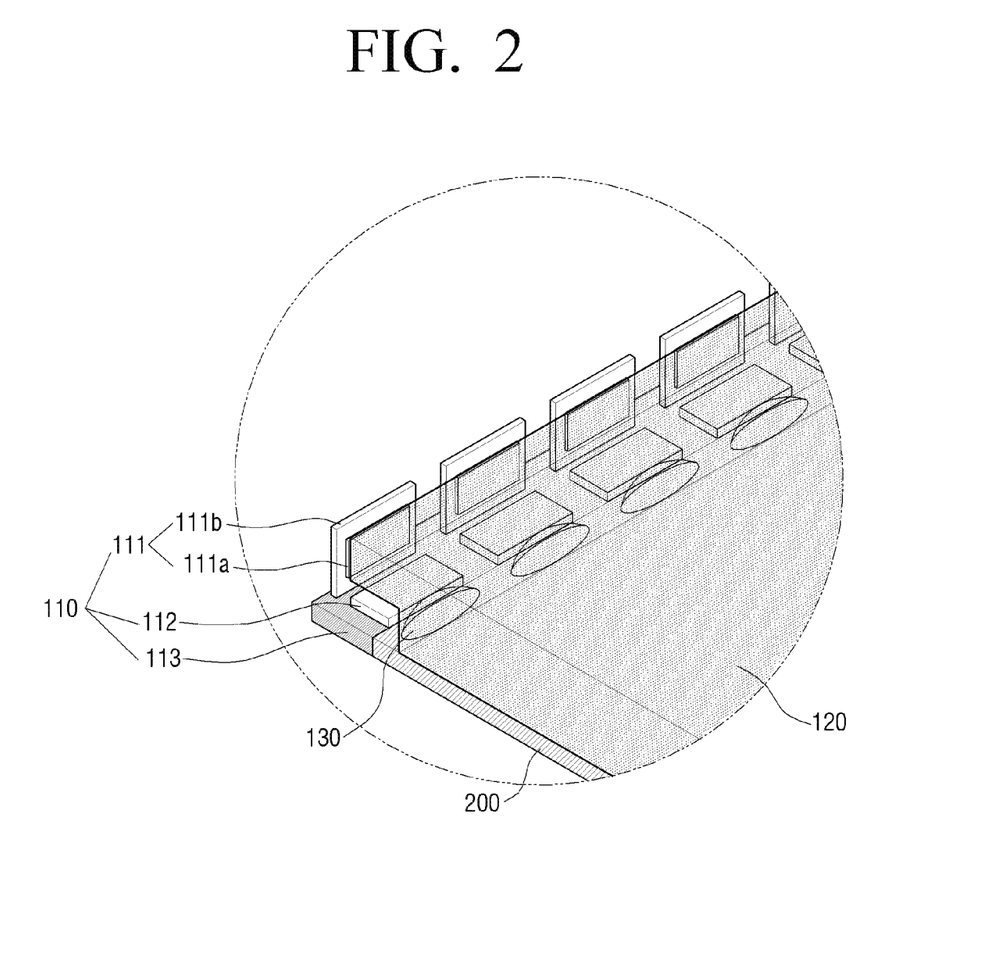
FIG. 2 is an enlarged perspective view of the backlight unit and the reflective sheet of FIG. 1.
Figure 3:
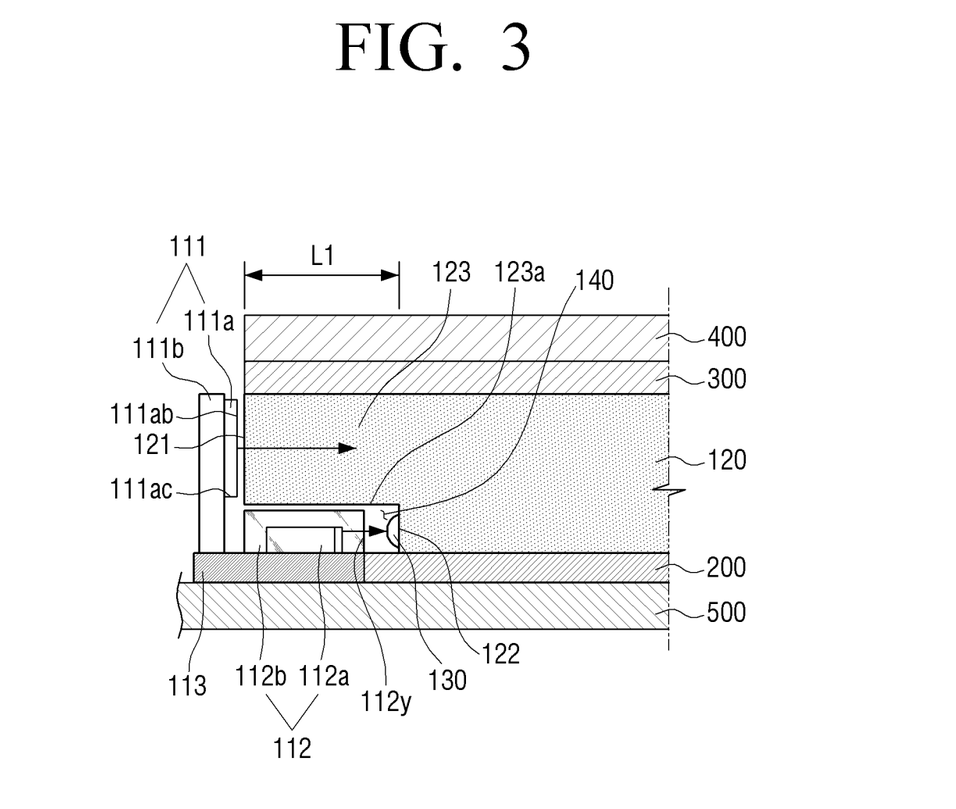
FIG. 3 is a side view of a portion of the display apparatus of FIG. 1.

FIG. 2 is an enlarged perspective view of the backlight unit 100 and the reflective sheet 200. FIG. 3 illustrates a side view of the display apparatus 1. It should be noted that portions of the chassis 500 have been omitted from the drawings for clarity and convenience of description. For example, although not illustrated in FIG. 3, the chassis 500 of the present embodiment may enclose a back of the backlight unit 100, the reflective sheet 200, the optical sheet 300, and/or the display panel 400.

As shown in FIGS. 2 and 3, the backlight unit 100 includes the plurality of light source units 110 and the light guide plate 120.

The light source units 110 include first and second light source modules 111 and 112 and a printed circuit board (PCB) 113. The first and second light source modules 111 and 112 of the present embodiment are mounted to the PCB 113. The first and second light source modules 111 and 112 of the present embodiment may be disposed parallel to one another at preset intervals on an upper surface of the PCB 113. The first and second light source modules 111 and 112 may be mounted along with the PCB 113 to be supplied with necessary power.

The first and second light source modules 111 and 112 respectively include first and second light emitters 111*a* and 112*a* that emit light. The first light source modules 111 further include support parts 111*b* that support the first light emitters 111*a*. The first and second light source modules 111 and 112 may include two types of light sources configured to emit light having different light emission distributions. For example, in the present exemplary embodiment, the first light emitters 111*a* include cyan LEDs, and the second light emitters 112*a* include red LDs. Alternatively, the light emitters 111*a* may include LEDs that emit light having colors such as blue, green, red, etc. or may include cold cathode fluorescent lamps (CCFLs), external electrode fluorescent lamps (EEFLs), organic light-emitting diodes (OLEDs), or the like. Likewise, in other embodiments, the second light emitters 112*a* may include LDs that emit lights having different colors such as blue, green, etc. or may include LEDs, CCFLs, EEFLs, OLEDs, or the like. Because the light source units 110 may include two types of light sources as described above, lights emitted from these two types of light sources may complement one another. As a result, the light source units 110 may realize higher color reproduction ranges than a backlight unit using only a single type of light source.

As mentioned above, the first light emitters 111*a* of the present exemplary embodiment include LEDs and the second light emitters 112*a* of the present exemplary embodiment include LDs. Use of these two types of light sources allows the backlight unit 100 to realize an improved color range. Although the backlight unit 100 of the present exemplary embodiment uses two types of light sources (LEDs and LDs), the backlight unit 100 includes only a single light guide plate 120, thereby reducing an overall thickness of the backlight unit 100 and the display apparatus 1. The first and second light source modules 111 and 112 and the light guide plate 120 will be described in greater detail below.

The light irradiated from LDs of the second light emitters 112*a* is laser light and has a lower light emission distribution than the light irradiated from LEDs of the first light emitters 111*a*. In order to use these two types of light sources and only a single light guide plate 120, the emission distribution of the light irradiated from the second light emitters 112*a* is changed to be wider so as to be similar to the emission distribution of light irradiated from the light emitters 111*a*. In other words, the emission distribution of the light emitted from LDs of the second light emitters 112*a* is changed to be similar to the emission distribution of the light emitted from LEDs of the first light emitters 111*a* such that a single light guide plate 120 may be used, as opposed to using two types of light guide plates.

Referring to FIGS. 2 and 3, the first and second light source modules 111 and 112 are disposed adjacent to a side of the light guide plate 120, i.e., along an edge of the light guide plate 120, and arranged to irradiate light toward the light guide plate 120. It should be appreciated that the term "adjacent," when used to describe the position of the first and second light source modules 111 and 112 relative to the side of the light guide plate 120, merely means opposite of, and may include positions which are offset from or directly against the side of the light guide plate 120. The first light source modules 111 are disposed adjacent to a first upper part of the edge of the light guide plate 120, and the second light source modules 112 are disposed adjacent to a second lower part of the edge of the light guide plate 120. Hereinafter, for convenience of description, the first upper part of the edge of the light guide plate 120 is referred to as a first part 121, and the second lower part of the edge of the light guide plate 120 is referred to as a second part 122.

In the present embodiment, the first and second light source modules 111 and 112 are offset from one another. In particular, front ends 111*ab* of the first light source modules 111 are offset from front ends 112*y* of the second light source modules 112. In the present embodiment, the front ends 112*y* of the second light source modules 112 are disposed closer to the edge of the light guide plate 120 than the front ends 111*ab* of the first light emitters 111*a*. Alternatively, in some other embodiments, the front ends 111*ab* of the first light emitters 111*a* are disposed closer to the edge of the light guide plate 120 than the front ends 112*y* of the second light source modules 112.

Additionally, the first light source modules 111 are disposed closer to the display panel 400 than the second light source modules 112. In particular, the second light source modules 112 are disposed at a height lower than a height of the first light source modules 111. The height of the first light source modules 111 corresponds to a height of the first part 121 and the height of the second light source modules 112 corresponds to a height of the second part 122. As such, as discussed above, the first light source modules 111 irradiate light toward the first part 121 of the light guide plate 120, and the second light source modules 112 irradiate light toward the second part 122 of the light guide plate 120.

Further, lower ends 111ac of the first light emitters 111a are disposed at a height higher than a height of the second light source modules 112 to enable light irradiated from the first light emitters 111a to be irradiated toward the first part 121 of the light guide plate 120 without interference from the second light source modules 112.

The second light source modules 112 include molding parts 112b that enclose the second light emitters 112a. The molding parts 112b may be formed of a transparent material to enable the light emitted from the second light emitters 112a to be irradiated toward the light guide plate 120. In some embodiments, a light irradiation direction of the light emitted from the second light emitters 112a may not be perpendicular to the edge of the light guide plate 120 but may instead be inclined at a preset angle with respect to the edge of the light guide plate 120 to enable the light emitted from the second light emitters 112a to have a similar emission distribution to light emitted from the first light emitters 111a.

A plurality of lens units 130 may be attached onto the second part 122 of the light guide plate 120. The lens units 130 may be convex lenses that are convex toward the second light emitters 112a. The light emitted from the second light emitters 112a is directed toward the lens units 130. The light is then diffused and refracted through the lens units 130. As a result, the light emitted from the second light emitters 112a passes through the lens units 130 to widen distribution thereof and is then incident onto the second part 122 of the light guide plate 120. As described above, the lens units 130 perform the function of widening the light emission distribution of the light emitters 112a. In some embodiments, the lens units 130 may be replaced with concave lenses or may be replaced with another type of lenses or mirrors capable of diffusing the light emitted from the second light emitters 112a.

As shown in FIG. 3, the first part 121 of the light guide plate 120 includes a protruding part 123 that protrudes from a side of the light guide plate 120 by a preset length L1 relative to the second part 122. Therefore, the first part 121 of the light guide plate 120 may be close to the first light source modules 111. As a result, light emitted from the first emitters 111a may be incident onto the light guide plate 120 without being lost.

The second light source modules 112 may be disposed under a portion of the protruding part 123. A step difference space 140 is defined by a lower surface 123a of the protruding part 123 and the second part 122 of the light guide plate 120. Therefore, as shown in FIG. 3, the second light source modules 112 may be housed in the step difference space 140 to enable the front ends 112y of the second light source modules 112 to be disposed close to the second part 122. Therefore, the light emitted from the second light emitters 112a may be incident onto the second part 122 without dissipation.

Also, the structure of the backlight unit 100 as described above may minimize a gap between the edge of the light guide plate 120 and the first and second light source modules 111 and 112 that are disposed to be adjacent to the edge of the light guide plate 120. Therefore, a thickness of a bezel of the display apparatus 1 including the backlight unit 100 may be reduced.

Figure 4:
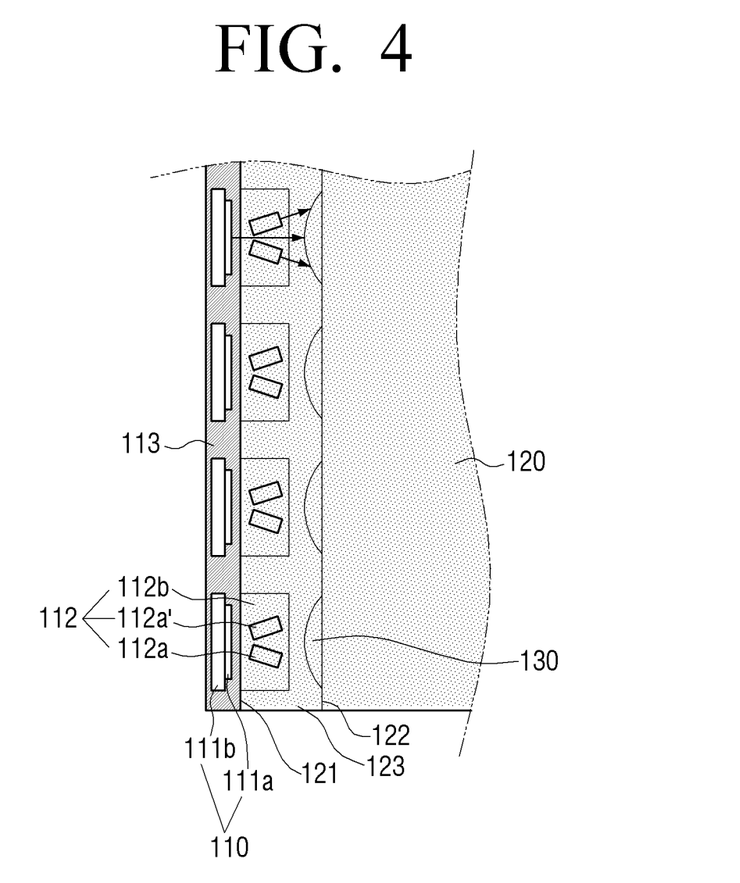
FIG. 4 is a plan view of a portion of the backlight unit of FIG. 1.

FIG. 4 is a plan view of a portion of the backlight unit 100. Referring to FIG. 4, a plurality of light emitters 112a is included, and every two of the light emitters 112a are disposed as a pair, i.e., paired together.

Figure 5:
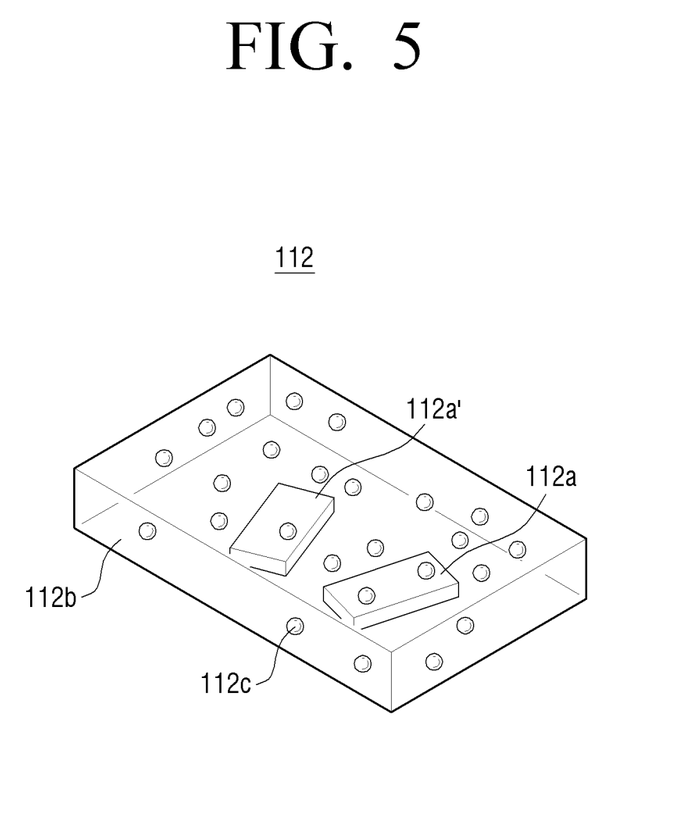
FIG. 5 is a perspective view of a second light source module of the backlight unit of FIG. 1.

FIG. 5 is a perspective view of the second light source modules 112. The second light source modules 112 include the second light emitters 112a and the molding parts 112b that enclose the second light emitters 112a and further include light diffusion members 112c in the molding parts 112b to diffuse light emitted from the second light emitters 112a. The light diffusion members 112c may have globular shapes and may reflect or refract light passing through the molding parts 112b to thereby diffuse the light. Therefore, the emission distribution of light irradiated from the second light source modules 112 may be widened.

Figure 6:
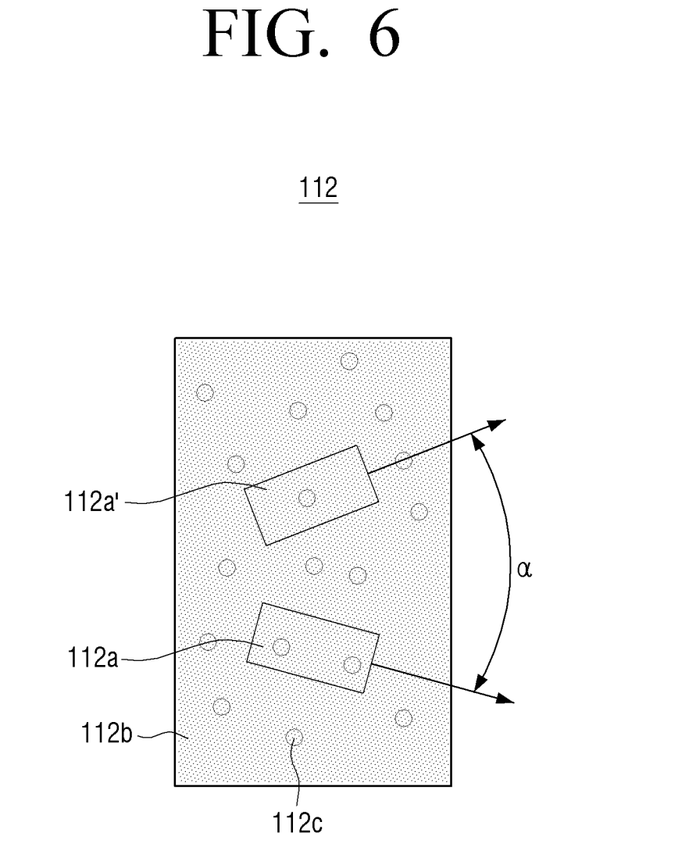
FIG. 6 is a plan view of the second light source module of FIG. 5.

As described above, the plurality of the second light emitters 112a are included, and every two of the second light emitters 112a are paired together. As shown in FIG. 6, an irradiation direction of a second light emitter 112a disposed on a first side of the molding part 112b and an irradiation direction of a second light emitter 112a' disposed on a second side of the molding part 112b are directed toward the light guide plate 120 and are arranged angularly relative to one another by a preset angle α. Therefore, the light emitter 112a disposed on the first side of the molding part 112 and the light emitter 112a' disposed on the second side of the molding part 112b are arranged angularly relative to each other. As a result, the emission distribution of light irradiated from the second light source modules 112 toward the second part 122 of the light guide plate 120 may be widened.

In some embodiments, in order to widen the emission distribution of the light irradiated through the second light source modules 112 and to minimize light loss, the angle a that is formed by the irradiation direction of the second light emitter 112a disposed on the first side of the molding part 112b and the irradiation direction of the second light emitter 112a' disposed on the second side of the molding part 112b may be 45°.

Figure 7:
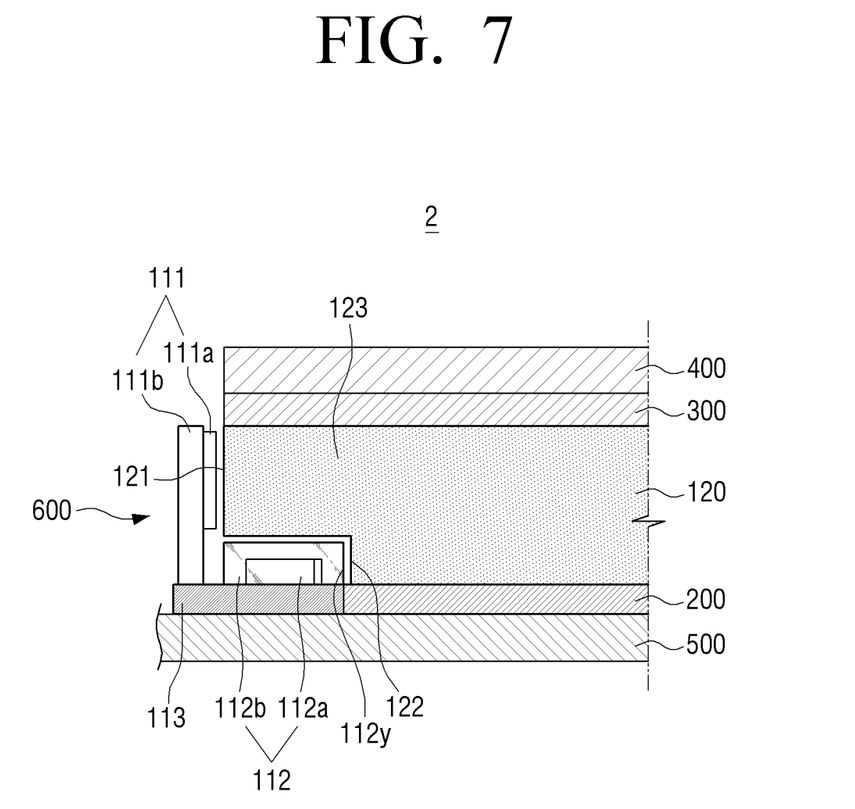
FIG. 7 is a side view of a portion of a display apparatus according to an exemplary embodiment of the present disclosure.
Figure 8:
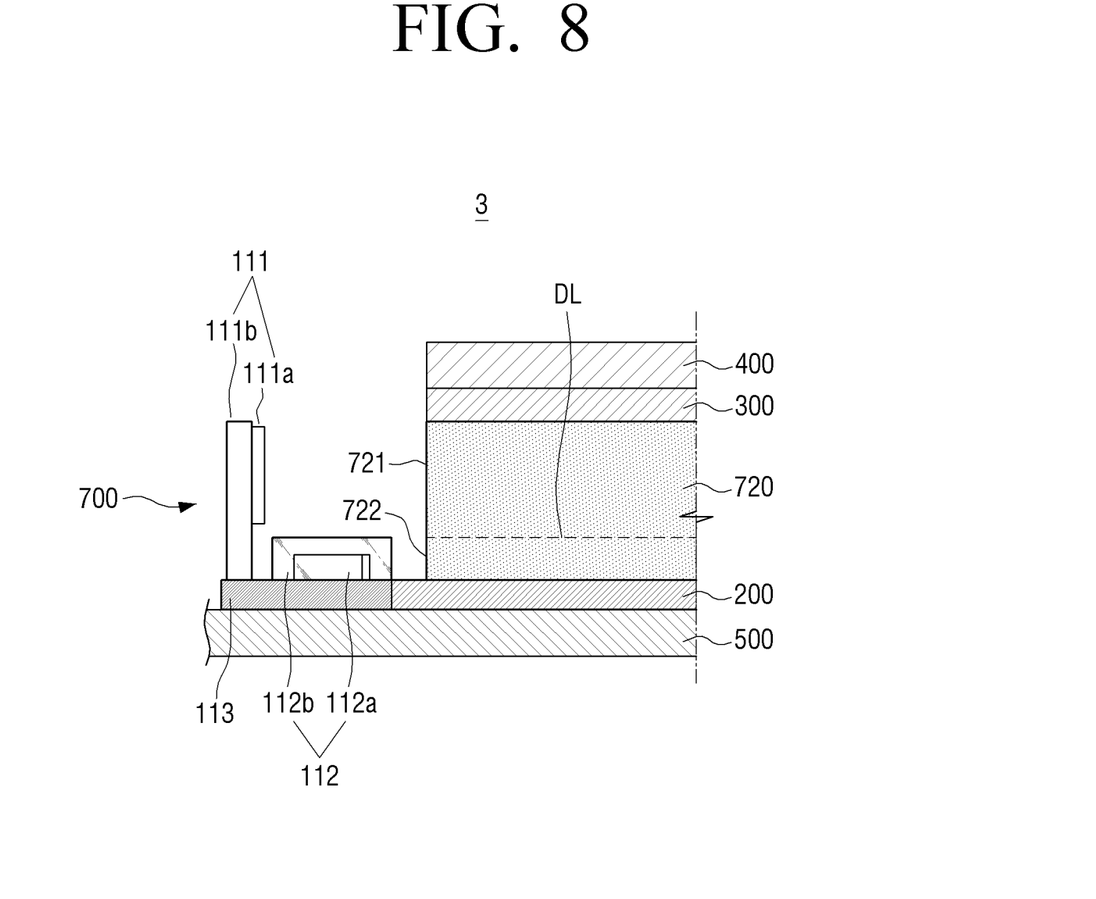
FIG. 8 is a side view of a portion of a display apparatus according to an exemplary embodiment of the present disclosure.

FIGS. 7 and 8 respectively illustrate display apparatuses 2 and 3 according to other exemplary embodiments of the present disclosure. A reflective sheet 200, an optical sheet 300, a display panel 400, and a chassis 500 of each of the display apparatuses 2 and 3 are the same as, or similar to, the sheet 200, the optical sheet 300, the display panel 400, and the chassis 500 discussed above with reference to display apparatus 1. Differences between the structure and function of elements of the display apparatuses 2 and 3 and those of the display apparatus 1 will be described in greater detail below. As with the chassis 500 of the display apparatus 1 described above, portions of the chassis 500 of the display apparatuses 2 and 3 have been omitted from the drawings for clarity and convenience of description. For example, although not illustrated in FIGS. 7 and 8, the chassis 500 of the present embodiment may enclose a back of the backlight unit 100, the reflective sheet 200, the optical sheet 300, and/or the display panel 400.

FIG. 7 is a side view of a portion of the display apparatus 2 according to an exemplary embodiment of the present disclosure. Unlike the backlight unit 100 of the display apparatus 1 described above, a backlight unit 600 of the present exemplary embodiment omits a lens unit 130. By omitting the lens unit 130, space is no longer needed to accommodate the lens unit 130. As such, a second part 122 of a light guide plate 120 is able positioned closer to a front end 112y of a second light source module 112. As a result, light irradiated from the second light source module 112 toward the second part 122 may be incident onto a light guide plate 120 without being lost. A size of the display apparatus 2 including the backlight unit 600 may also be reduced by omitting the lens unit 130 and the space necessary to accommodate the lens unit 130.

FIG. 8 is a side view of a portion of the display apparatus 3 according to yet another exemplary embodiment of the present disclosure. Unlike the backlight units 100 and 600 of the display apparatuses 1 and 2 described above, a backlight unit 700 of the present exemplary embodiment omits a lens unit 130, and a first part 721 does not protrude from a side of a light guide plate 720 relative to a second part 722. As shown in FIG. 8, a virtual dotted line DL is illustrated to divide the first part 721 and the second part 722 of the light guide plate 720 from each other. A first light source module 111 may be further offset from the light guide plate 720 than in previous embodiments such that a preset space may be provided between the first light source module 111 and the light guide plate 720. Therefore, heat generated from a light source unit 110, which includes the first and second light source modules 111 and 112, may be more effectively emitted outside the backlight unit 700. Therefore, a temperature of the backlight unit 700, having a high heat generation rate, and a temperature of the display apparatus 3, may be lowered more effectively.

A display apparatus including a backlight unit as described above may use two types of light sources to increase a color reproduction range of an image displayed on a display panel. Although the display apparatus includes two types of light sources, the display apparatus may also include only a single light guide plate not two light guide plates to reduce a thickness of the backlight unit. Therefore, the display apparatus including the backlight unit may achieve a higher quality display while also reducing a thickness thereof. Also, the display apparatus, including the backlight unit, may be applied to various types of devices such as a smartphone, a TV, a computer monitor, a tablet, etc., and thus thicknesses of various types of devices may also be reduced according to demands of users of ultra-thin devices.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A backlight unit comprising:
    a light guide plate configured to emit light incident thereon; and
    a first plurality of light source modules disposed adjacent to an edge of the light guide plate to irradiate light toward the light guide plate; and
    a second plurality of light source modules disposed adjacent to the edge of the light guide plate to irradiate light toward the light guide plate,
    wherein the first plurality of light source modules irradiates a first type of light, wherein the second plurality of light source modules irradiates a second type of light,
    wherein the first plurality of light source modules are disposed adjacent to a first part of the edge of the light guide plate, and the second plurality of light source modules are disposed adjacent to a second part of the edge of the light guide plate.

2. The backlight unit of claim 1, wherein the first plurality of light source modules and the second plurality of light source modules irradiate two types of light toward different parts of the same edge of the same light guide plate.

3. The backlight unit of claim 1, further comprising:
    a display panel,
    wherein the first plurality of light source modules is disposed closer to the display panel than the second plurality of light source modules.

4. The backlight unit of claim 3, further comprising:
    a printed circuit board having a surface on which the first plurality of light source modules and the second plurality of light source modules are mounted.

5. The backlight unit of claim 3, wherein a height of the second plurality of light source modules is lower than a height of the first plurality of light source modules relative to the display panel.

6. The backlight unit of claim 3, wherein a first light emission distribution of the first plurality of light source modules is different from a second light emission distribution of the second plurality of light source modules.

7. The backlight unit of claim 1, wherein the first plurality of light source modules comprises first light emitters, and the second plurality of light source modules comprises second light emitters,
    wherein the second light emitters are disposed in pairs, and
    wherein each pair of the paired second light emitters is arranged relative to one another such that irradiation directions of the paired second light emitters are directed toward the light guide plate and oriented angularly relative to one another.

8. The backlight unit of claim 7, wherein the second plurality of light source modules comprises transparent molding parts configured to enclose the second light emitters.

9. The backlight unit of claim 8, wherein the second plurality of light source modules further comprises light diffusion members disposed within the transparent molding parts.

10. The backlight unit of claim 7, wherein the first light emitters comprise at least one of light-emitting diodes, cold cathode fluorescent lamps, organic light-emitting diodes, and external electrode fluorescent lamps and the second light emitters are laser diodes (LDs).

11. The backlight unit of claim 10, wherein the LDs are red LDs, and the first light emitters are cyan light-emitting diodes.

12. The backlight unit of claim 1, further comprising:
    a plurality of lens units formed on the second part of the edge of the light guide plate.

13. The backlight unit of claim 1, wherein first front ends of the first plurality of light source modules are offset from second front ends of the second plurality of light source modules relative to the edge of the light guide plate.

14. The backlight unit of claim 13, wherein the second front ends are disposed closer to the edge of the light guide plate than the first front ends.

15. The backlight unit of claim 1, wherein a protruding part of the edge of the light guide plate protrudes from a side of the light guide plate relative to the second part of the edge of the light guide plate.

16. The backlight unit of claim 15, wherein the second plurality of light source modules is disposed under the protruding part of the edge of the light guide plate.

17. A backlight unit comprising:
    a light guide plate configured to emit light incident thereto;
    a plurality of light source units configured to irradiate light toward an edge of the light guide plate; and
    a printed circuit board comprising a surface on which the plurality of light source units are mounted, wherein the plurality of light source units comprises first light source modules and second light source modules, wherein the first light source modules and the second light source modules are configured to irradiate light toward a common edge of the light guide plate, and wherein the first light source modules are configured to irradiate light having a first light emission distribution, and the second light source modules are configured to irradiate light having a second light emission distribution.

18. The backlight unit of claim 17, wherein the second light source modules comprise second light emitters, wherein the second light emitters are disposed in pairs, and wherein each pair of the paired second light emitters is arranged relative to one another such that irradiation directions of the paired second light emitters are directed toward the light guide plate and oriented angularly relative to one another.

19. A display apparatus comprising:

a display panel;

a chassis configured to enclose at least a portion of the display panel; and a backlight unit supported by the chassis, wherein the backlight unit comprises:

a light guide plate disposed behind the display panel; and a plurality of light source units disposed adjacent to an edge of the light guide plate and configured to irradiate light toward the light guide plate, wherein each light source unit of the plurality of light source units comprises a first light source module and a second light source module configured to irradiate different types of light toward a common edge of the same light guide plate, wherein the first light source modules are disposed adjacent to a first part of the common edge of the light guide plate, and the second light source modules are disposed adjacent to a second part of the common edge of the light guide plate.

20. The display apparatus of claim 19, wherein the first light source modules are disposed closer to the display panel than, the second light source modules, wherein front ends of the first light source modules are offset from front ends of the second light source modules relative to the common edge of the light guide plate.

\* \* \* \* \*